United States Patent
Haug et al.

[11] Patent Number: 5,871,620
[45] Date of Patent: Feb. 16, 1999

[54] PROCESS AND DEVICE FOR REDUCING THE NITRATE CONTENT OF WATER

[75] Inventors: Helmar Haug, Bisingen; Eva Gotthold, Albstadt; Joffrey Jänicke, Albstadt; Rene Jänicke, Albstadt; Nadine Herter, Albstadt, all of Germany

[73] Assignee: Andrea Egner, Adelsheim, Germany

[21] Appl. No.: 885,094

[22] Filed: Jun. 30, 1997

Related U.S. Application Data

[63] Continuation of PCT/DE95/01857, Dec. 27, 1995, published as WO96/20136, Jul. 4, 1996.

[30] Foreign Application Priority Data

Dec. 28, 1994 [DE] Germany ............ 44 47 035.5

[51] Int. Cl.⁶ ............ C07C 1/00; B01D 15/00; C02F 9/00; B01J 19/08
[52] U.S. Cl. ............ 204/157.15; 210/198.1; 210/258; 210/259; 210/748; 210/757; 422/186.3; 250/436; 250/438
[58] Field of Search .......... 204/157.15; 210/198.1, 210/258, 259, 748, 757; 422/186.3; 250/436, 438

[56] References Cited

U.S. PATENT DOCUMENTS

| | | | |
|---|---|---|---|
| 4,857,204 | 8/1989 | Joklik | 210/748 |
| 5,234,606 | 8/1993 | Kazama et al. | 210/748 |
| 5,247,178 | 9/1993 | Ury et al. | 250/438 |
| 5,393,394 | 2/1995 | Ikeda et al. | 210/748 |
| 5,569,810 | 10/1996 | Tsuji | 204/157.15 |

FOREIGN PATENT DOCUMENTS

88/01986  3/1988  WIPO.

OTHER PUBLICATIONS

Zhang et al., "Photodecomposition of Organic Nitrogen Compounds and Determination of Total Nitrogen in Water", Gaodeng Xuexiao Huaxue Xuebao, vol. 7, No. 4, pp. 325–330. Abstract only, 1986.

Primary Examiner—Arun S. Phasge
Assistant Examiner—Edna Wong
Attorney, Agent, or Firm—Darby & Darby

[57] ABSTRACT

To decrease the nitrate content of water, it is proposed to reduce nitrate to nitrogen in two stages. The first of these stages is a photochemical reduction to nitrite, and the second stage is a reduction of nitrite to nitrogen using amidosulphuric acid.

23 Claims, 3 Drawing Sheets

PROCESS AND DEVICE FOR REDUCING THE NITRATE CONTENT OF WATER

This is a continuation of international application Ser. No. PCT/DE95/01857, filed Dec. 27 1994.

FIELD OF THE INVENTION

The invention relates to a process for reducing the nitrate content of water and to a device for carrying out the same.

BACKGROUND OF THE INVENTION

DE-A-42 12 604 discloses a process for conditioning organically polluted raw drinking water which is polluted with crop-protection agents, a UV treatment with light being performed. In this case, the technical problem underlying the disclosure is to provide a process, one of the purposes of which is to avoid sub-sequent oxidative treatment of the drinking water to be conditioned. In this case ultraviolet light having a wavelength of >240 nm is used. If light which also has components below 240 nm is used, nitrite-destroying substances are simultaneously added.

The purpose of the process is to destroy organic compounds, in particular crop-protection agents such as atrazine, without converting nitrate to nitrite.

U.S. Pat. No. 5,122,496 discloses a device which treats water contaminated with nitrate and/or nitrite. In this case catalysts are used which have defined pore radii. A UV lamp is used to kill off microorganisms.

Owing to more stringent legal stipulations for drinking water quality, the problem arises for many waterworks of forcing residual nitrate quantities of 50 mg/l and above, as occur in sources presently used, below the legal guide values of 25 mg/l, and, what is more, at economically justifiable costs and without introducing substances which are not in any case usually present in normal drinking water.

To solve this problem, the present invention proposes a two-stage process: in a first step, the nitrate-containing water to be treated is irradiated in a thin layer with UV treatment light whose spectrum is chosen so that it is absorbed by nitrate. As a result, in the aqueous environment, nitrate is reduced to nitrite with simultaneous release of oxygen.

The wavelength of the UV light used in the first process step simultaneously corresponds to an absorption maximum of nitrate ions in an aqueous environment and also to an absorption minimum of water, the wavelength of the UV light being in the range between 200 and 230 nm and the pH in the first process step being in the range between 8 and 11.

In a second process step, the nitrite thus obtained is then completely reduced to nitrogen using a chemical reducing agent.

For the second, chemical step, use may be made of industrially manufactured inexpensive chemicals which are acceptable with regard to the use of drinking water, such as amidosulphuric acid. Obviously, no undesirable chemicals whatsoever are introduced into the water by the first step either.

In this manner, an effective and inexpensive reduction of the nitrate content is achieved overall.

Advantageous developments of the process according to the invention are specified in subclaims.

For the first, photochemical, process step, it is advantageous if the volume of water to be treated by the treatment light utilizes the quanta given off by the treatment light source as completely as possible. For this purpose, the invention proposes a device for carrying out the process which comprises the features listed in Claim 9.

Advantageous developments of this device are in turn the subject-matter of subclaims.

BRIEF DESCRIPTION OF THE DRAWINGS

The invention is described below in more detail on the basis of illustrative examples with reference to the drawing. In the drawing, FIG. 1. shows a diagrammatic view of a plant for reducing the nitrate content in drinking water.

DETAILED DESCRIPTION OF A PREFERRED EMBODIMENT

Figure 1:
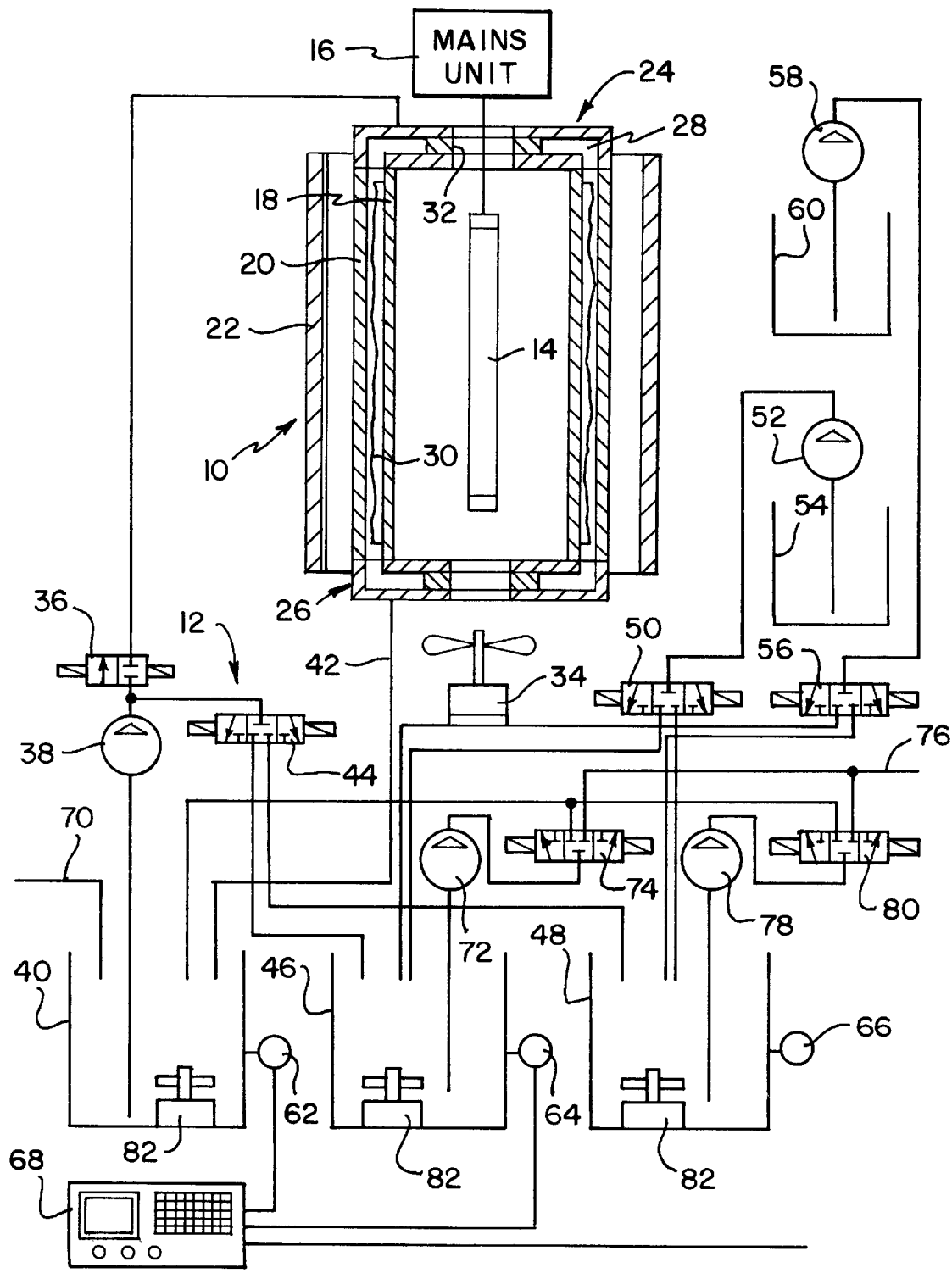

FIG. 1 shows diagrammatically a plant for reducing the nitrate content of drinking water, which shows a UV reduction reactor, designated overall by 10, in the upper left portion of the figure, whereas the lower right-hand portion of the figure shows a reduction reactor 12 working with a chemical reducing agent.

The UV reduction reactor 10 comprises a rod-shaped UV lamp 14 which is operated from an appropriate mains unit 16.

The UV lamp 14 generates LTV light of wavelengths which are absorbed by nitrate ions situated in the aqueous environment. Of the various UV absorption bands of the nitrate ion, preferably one is chosen for which the UV absorption is high, compared with that of the water.

For laboratory experiments, the UV lamp used was a 125 W high-pressure mercury vapour lamp. At an electrical power consumption of 125 W, this generates in the UV C (248–280 nm) a quantum flux of 8.9 W, in the UV B a quantum flux of 8.7 W and in the UV A a quantum flux of 7.8 W.

The UW lamp 14 is surrounded by a quartz cylinder 18. This is itself surrounded by a second quartz cylinder 20, on the outside of which is situated a metal cylinder 22. Its inside is constructed as a reflecting surface.

The two quartz cylinders 18 and 20 are sealed by head parts 24, 26, each of which predetermines an annular distributor space 28 which is connected to one of the two ends of the annular space of radially small size restricted by the two quartz cylinders. In addition, there is inserted into this annular space a cylindrical wire gauze 30, which is made of plastic. The wire gauze is corrugated in such a way that it lies with its outsides in the vicinity of the mutually opposite surfaces of the two quartz cylinders 18, 20.

The head parts 24, 26 each delimit a central throughway 32, so that a fan 34 can blow cooling air through the interior of the quartz cylinder 18 and over the UV lamp 14.

The upper head part 24 is connected via a 2/2 solenoid valve 36 to the outlet of a pump 38, which receives intake from a reservoir 40. The interior of the lower head part 26 is likewise connected to the reservoir 40 via a line 42.

In the reservoir 40 there is situated nitrate-containing water to be treated. If the pump 38 is running and the solenoid valve 36 has been moved to the open position, the pump 38 moves water from the reservoir 40 through the annular space existing between the two quartz cylinders 18 and 20, the wires of the wire gauze 30 representing chicanes, at which vortexes form, so that the water, on the path through the annular space lying between the quartz cylinders, is intensively exchanged in a radial direction.

The UV light quanta given off by the UV lamp 14 are absorbed by the nitrate ions situated in the water. A primary reaction initially occurs in this case.

$$NO_3^- \longrightarrow NO_3 + e^-(aq) \qquad (I)$$

Following this photochemically induced reaction, nitrite, oxygen and singlet oxygen form, and possibly via side reactions a few H+ions form.

Overall, the conversion of nitrate to nitrite corresponds to the reaction equation

$$2\ NO_3^- \longleftrightarrow 2\ NO_2^- + O_2 \qquad (II).$$

It can be seen from the above equation (II) that the reaction equilibrium is displaced in the direction of nitrate with increasing concentrations of nitrite and oxygen.

Nitrate is also reformed by disproportionation according to the equation

$$3\ HNO_2 \rightarrow 2\ NO + HNO_3 + H_2O \qquad (III),$$

for which it has been found that the photochemically induced formation of nitrite ceases at a pH of about 6.

It can be seen from the above considerations that the photochemical reduction of nitrate to nitrite is promoted overall if the resulting nitrite is removed from the water and care is taken to ensure a pH of above 6, preferably if a pH is set in the range from 9 to 11.

The chemical reduction reactor shown in the lower right-hand part of FIG. 1 serves to establish the abovementioned preferred conditions for the first, photochemical, process step of the reduction of nitrate to nitrogen and for the residual chemical reduction of nitrite.

Via a 3/3 solenoid valve 44, the line 42 can optionally be connected to one of two reaction vessels 46, 48. An amidosulphuric acid solution (pH 3) can be pumped from a reservoir 54 by a metering pump 52 via a further 3/3 solenoid valve 50 into the respective reaction vessel selected from the reaction vessels 46, 48, so that the nitrite is reduced there in accordance with the equation below:

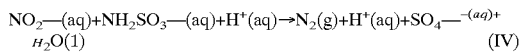

$$NO_2^-(aq) + NH_2SO_3^-(aq) + H^+(aq) \rightarrow N_2(g) + H^+(aq) + SO_4^{-(aq)+} \\ H_2O(l) \qquad (IV)$$

NaOH solution can then be conveyed from a reservoir 60 via a metering pump 58 via a further 3/3 solenoid valve 56 into the respective reaction vessel selected from the reaction vessels 46, 48, in order to re-establish a pH between 9 and 11.

As simple sensors which monitor the respective instantaneous state of the liquid volumes situated in the vessels 40, 46 and 48, use is made of pH sensors 62, 64, 66. Their output signals are connected to three inputs of a control unit 68.

The vessels 40, 46 and 48, in the illustrative example considered here, all have the same size and, for the sake of clarity and for easier explanation, it is assumed that in each case the entire liquid volumes are exchanged between these vessels. However, in practice, vessels of different sizes may also be used and the exchange of quantities of liquid may be restricted to those amounts which are necessary to re-establish adequate conditions for the first process step of UV-induced reduction of nitrate to nitrite or of residual reduction of nitrite.

Nitrate-containing water to be purified is fed to the reservoir 40 via a line 70, which arrives from a conventional mechanical/chemical preliminary purification.

The reaction vessel 46 is assigned a pump 72 which can force water situated in this vessel via a 3/3 solenoid valve 74 either back into the reservoir 40 or into a pure water delivery line 76. Similarly, water situated in the reservoir 48 can be conveyed by a pump 78 via a 3/3 solenoid valve 80 either into the reservoir 40 or into the delivery line 76.

Agitators 82 assigned to the vessels 40, 46 and 48 ensure mixing of the amounts of water situated in the vessels.

The above-described drinking water treatment plant operates broadly as follows:

Water fed via the line 70 is first circulated by the pump 38, with the solenoid valve 36 opened by the control unit 38, through the annular space situated between the quartz cylinders 18, with turbulence continuously being generated in the water there by the wire gauze 30, so that partial volumes are continuously coming newly into contact with the outside of the quartz cylinder 18. Nitrate is reduced to nitrite in accordance with the above equation (I) by the UV light emitted by the UV lamp 14.

If the nitrite content in the circulated water has increased to such an extent that the reverse reaction to nitrate begins to a significant degree, which may be established via the pH sensor 62, the control unit 68 closes the solenoid valve 36 and opens the solenoid valve 44 to whichever of the reaction vessels 46, 48, which are operated as a whole in opposite phase, has just become empty. In the reaction vessel selected, by setting one of the two operating positions of the solenoid valve 50, acidic amidosulphuric acid solution (pH 3) is then fed to the appropriate reaction vessel of the reaction vessels 46, 48 until either the nitrite content is reduced to such an extent that the process step of the photoinduced nitrate reduction can be repeated, or else the nitrite content is below the nitrate content permitted under the established standard, so that, after discharge of the water from the appropriate reaction vessel, even after subsequent oxidation of the residual nitrite, an impermissibly high nitrate content is not obtained in the discharged water.

In a modification of FIG. 1, the solenoid valve 44 can also be constructed with a third operating position and the discharge line 76 can be charged via the pump 38 if the nitrate concentration in the reservoir 40 falls below a preset limit value.

It can be seen from the above description that water purified by the process according to the invention, in addition to the residual nitrate content lying within the legal standards and other permitted constituents already present in the water fed via the line 70, only contains additional sodium ions and sulphate ions. These ions are harmless for health reasons.

In the modified UV reduction reactors according to FIGS. 2 to 5, reactor components which correspond in function to components already explained with reference to FIG. 1 are again given the same reference numbers. These components are not again described in detail below.

Figure 2:
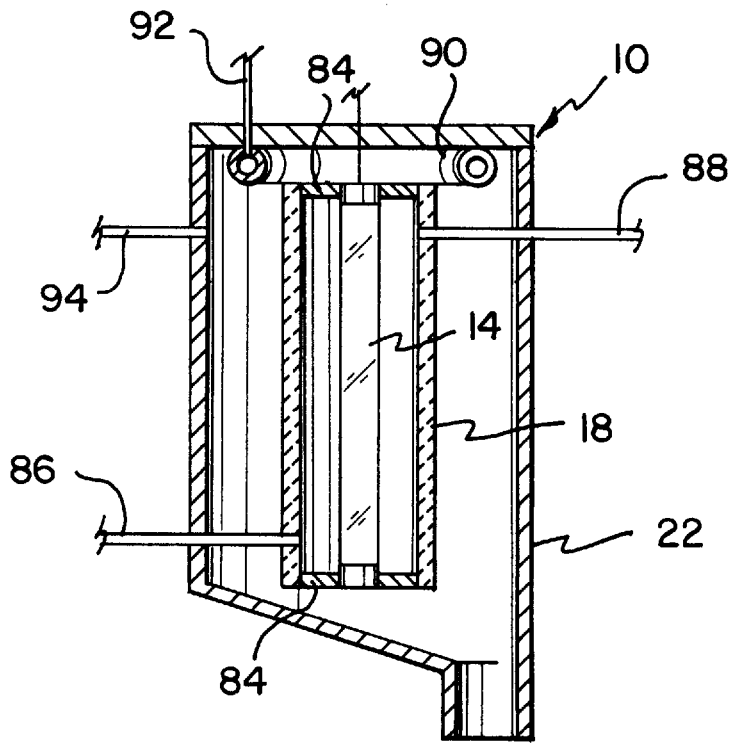
FIGS. 2 to 5. show modified illustrative examples of UV reduction reactors for the treatment plant according to FIG. 1.

In the UV reduction reactor according to FIG. 2, the UV lamp is enclosed liquid-tightly in the quartz cylinder 18 using end discs 84, through which quartz cylinder an air stream is circulated via lines 86, 88.

A spray nozzle ring 90 is provided coaxially to the quartz cylinder 18, the interior of which spray nozzle ring 90 is connected via a line 92 to the outlet of the pump 38. The spray nozzle ring 90 produces water droplets having a small diameter, in practice 0.5 to 1 mm, for example. These droplets move downwards under gravity in the annular space which is delimited by the quartz cylinder 18 and the metal cylinder 22, during which they are exposed to the light of the UV lamp 14. Via a further line 94, the interior of the UV reduction reactor 10 is charged with nitrogen at slightly above atmospheric pressure, in order to keep atmospheric oxygen away from the cylindrical droplet curtain.

Figure 3:
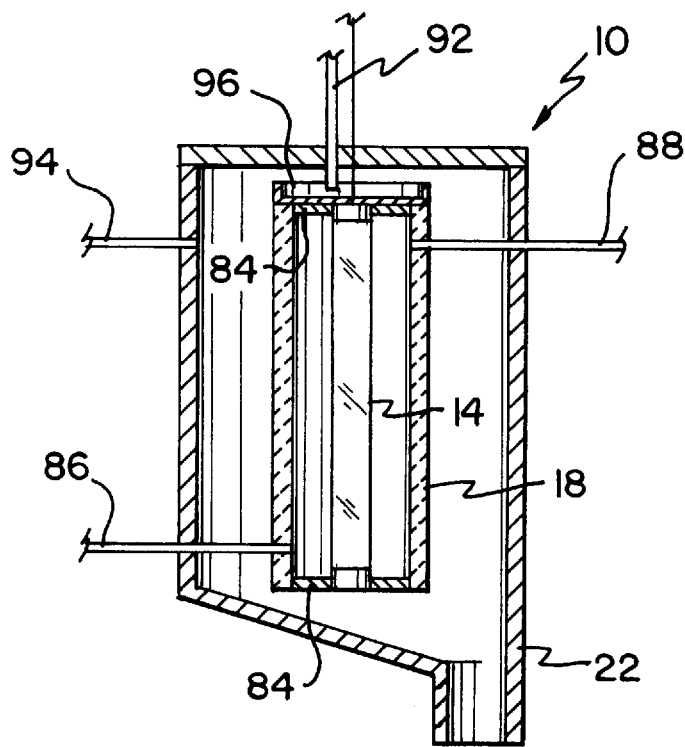

In the illustrative example according to FIG. 3, a thin downward-falling water film is produced on the outside of the quartz cylinder 18 by passing water fed via the line 92 into a distributor bowl 96, over the edge of which the water then runs down uniformly distributed in a peripheral direction.

Figure 4:
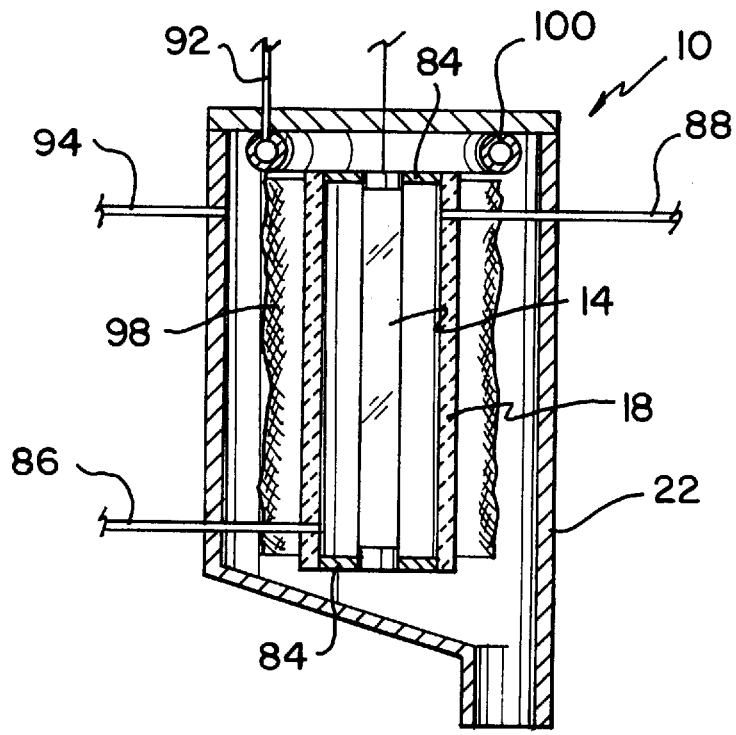

In the illustrative example according to FIG. 4, in the annular space between the quartz cylinder 18 and the metal cylinder 22 there is provided a cylindrical wire gauze 98 made of plastic which serves as a light-permeable trickling surface for a water film which is produced by a nozzle ring 100 in association with the wire gauze 98. The nozzle ring 100 delivers water droplets of a size such that they coalesce on the wire gauze 98 and thus form a coherently descending water film.

Figure 5:
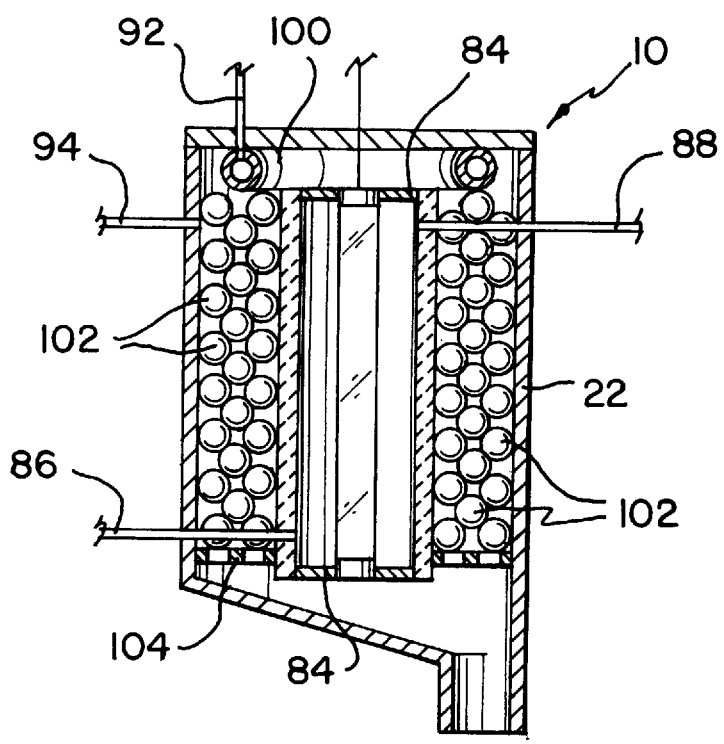

In the illustrative example according to FIG. 5, a trickling water layer having a large surface area is obtained by allowing large water droplets discharged by the nozzle ring 100 to run via a bed 102 which consists of quartz balls. The bed 102 is supported at the bottom by a perforated disc 104.

The process proves to have considerable advantages in comparison with other processes. The following may be mentioned here, for example:

- no concentration of nitrate as in reverse osmosis or in the case of ion exchangers, but a destruction of nitrate. Decreases in nitrate from 145 mg/l to 19 mg/l have been demonstrated.
- the favourable operating costs at approximately 15 l/s in comparison with other physicochemical processes.
- the small space requirement owing to the modularity and the favourable kinetics and the associated low capital expenditure.
- the continuous flow without retardation and the low capital expenditure associated in turn with this.

Further details of a practical illustrative example for a laboratory model of a plant according to the invention for removing nitrate from drinking water are given by the experimental description below.

The absorption spectra of nitrate and nitrite are in a wavelength range between 200 and 240 nm. Therefore, the drinking water is irradiated with a UV lamp whose UV radiation wavelengths are in this range.

On the one hand, the layer thickness of the thin water film which is irradiated with UV light must be great enough so that the majority of the quanta emitted by the UV lamp remain in the water owing to the nitrate absorption. On the other hand, the layer thickness must not be excessive, because the majority of the quanta are absorbed at the water surface. Example: 90% absorption gives an extinction of E=1. According to the Lambert-Beer Law, the following equation there applies for the layer thickness:

$$d = \frac{E}{\epsilon \cdot C}$$

where E=1
$c=10^{-3}$ mol/l (initial concentration)
$\epsilon=10^5$ l/mol (molecular absorption constant for wavelengths 200–240 nm) this gives
d=1 mm,
where
$I=10^{-\epsilon \cdot c \cdot d}$ (Lambert-Beer Law)
$I_o$
I=intensity.

A favourable film thickness should thus be in the range of approximately 1 mm. For exact definition of the experimental conditions, the excitation probability must be calculated using the following formula:

$$W = 1 - 10^{-\epsilon \cdot \phi \cdot t / A}$$

$\phi$=molar quantum flux in mol/s
t=exposure time in s
$\epsilon$=material constant in dm$^2$/mol
A=area in dm$^2$
and $$\phi = \frac{I_L \cdot \lambda}{h \cdot c \cdot N_L}$$

where
h=6.625·10$^{-34}$ J·s
c=2.9979·10$^{17}$ nm/s
$N_L$=1 mol≙6·10$^{23}$ particles
$\lambda$=wavelength in nm
$I_L$=lamp output as a function of wavelength.

The excitation probability for the wavelengths lying in the main nitrate absorption range can thus be calculated without problems for a lamp. Excitation probabilities of 80 to 90% can be achieved for wavelengths from 200 to 225 nm.

In the construction of the apparatus, a plurality of requirements must be heeded:

A thin water film around the lamp and, nevertheless, high volumetric flow rate.

Only air may be permitted between the water film and lamp. Use of wavelengths between 200 and 240 nm (nanometres) (high W in the formula due to a highly inexpensive and at the same time safe Philips UV lamp HOK 4/120/SE). On account of wavelengths between 200 and 240 nm, ozone forms, which must be removed and absorbed. It should be possible to create an approximately oxygen-free atmosphere by introducing $N_2$ gas (nitrogen). In the product of quantum flux and exposure time which influences the conversion rate, the exposure time increases with the circulation, in order to make up again for the relatively small quantum flux per unit area of the model lamp.

Exact measurements were made with an ion chromatograph. The ion chromatograph has the anion separation column Dionex AS4A and operates with the mobile phase $Na_2CO_3/NaHO_3$. The standard deviation is <1% on the basis of five measurements with one standard. The correlation coefficient of the calibration lines is $\gamma=0.999$. On this occasion, the opportunity is further taken to determine changes in cations, in particular those of $Na^+$, using an atomic absorption spectrograph (AAS). A further variable measured was the pH. The apparatus, with an accuracy of ±0.1, was calibrated before the measurements. Finally, the ozone concentration in the treated water was also measured photometrically.

The following findings are obtained from the experiments:

The decrease in nitrate at pH 10 and wavelengths of <248 nm is no longer restricted to 25%, in contrast to wavelengths of >248 nm.

At a relatively high initial concentration, nitrate initially falls precipitantly, and then from 30 mg/l it continues to fall as if only 30 mg/l had been used initially. At an initial concentration of 145 mg/l, a conversion rate of up to 87% can occur.

Model plant: with an operating period of 5 min (50 passes):

$$126 \frac{mg}{5 \min \cdot 1} = 25.2 \frac{mg}{1 \cdot \min}$$

Optimized plant: having an operating period of 6 s (1 pass):

$$126 \frac{mg}{1 \cdot 6 s} = 21 \frac{mg}{1 \cdot s}$$

Since the quantum yield is just below 1, after 5 min an excitation probability of 80–90% can be assumed in the model plant.

The process according to the invention can be utilized for nitrate reduction in drinking water by a new route, saving time. A faster decrease in nitrate is possible, particularly at the high concentration range (pH 10).

If the UV reactor were extended somewhat and the UV 10220 lamp from UV-Technik installed, at 1 kW input power, an approximately 40 times higher quantum flux could be generated. Then, the exposure time could be reduced to a single pass. With $I_L$=8W, the irradiated area A=3 dm$^2$ and the exposure time for a pass t=0.24 s at 30 l/min, an excitation probability of 80–90% is also achieved.

However, consideration must also be given to the fact that, owing to the powerful kW irradiator, more ozone is also introduced. However, ozone can be kept away from the water film by introducing $N_2$ gas.

The process of the invention can be utilized to give a nitrate reduction in drinking water by a new route, which is expedient with respect to control and consumption of energy and chemicals. This applies particularly in comparison with the known electrolysis process, which represents the only alternative to the present process with respect to modularity and space requirement.

On account of an excitation probability of 80–90%, wavelengths between 200 and 240 nm, pH 10 and a flow velocity of approximately 0.5 m/s on the defined wire gauze, an 80–90% decrease from 145 mg/l can be achieved. The combination of wavelengths (defined spectral distribution), pH, excitation probability and flow velocity is essential for this success and efficiency.

In the model apparatus, a thin water film flows past the lamp in such a manner that there is no quartz glass in between. For an industrial apparatus, it is proposed to provide a steep plane as water guide device, over which are mounted the UV irradiators with reflectors.

An alternative would be to produce a water film as in the described model apparatus by closely adjacent nozzles on a ring, so that a cylindrical curtain of droplets is formed. By this means the variations can be kept relatively small. In order that the evaporation does not become excessive, the temperature gradient in the space should remain low. Turbidity interferes little: the results of the experiments were obtained despite a slight turbidity at pH 10. As already mentioned, the photochemical reaction takes place at the surface. Slight changes in turbulence and changes in film thickness have no effect. Despite doubling the circulation rate from 7.5 l/min to 15 l/min, there was no change in the conversion rate. Since the ozone concentration in the water is <0.05 mg/l, the formation of toxic breakdown products from halogenated organic compounds can be excluded.

We claim:

1. A process for reducing the nitrate content of water comprising the steps of:
   (a) flowing a thin layer of said water through a tube which is transparent to UV light at a flow velocity which generates turbulence near the wall of the tube;
   (b) irradiating the thin layer of water flowing through said tube with UV light having a wavelength of between 200 and 240 nm at a pH of between 8 and 11 to reduce the nitrate to nitrite; and
   (c) thereafter reducing said nitrite to nitrogen by treating said nitrite with a chemical reducing agent in said water.

2. The process of claim 1, wherein the pH is from 9 to 10.

3. The process of claim 1, wherein the reducing agent comprises an amido compound.

4. The process of claim 3, wherein the amido compound is amido sulfuric acid.

5. The process of claim 1, wherein the flow velocity of the water is about 0.5 m/s to 2.5 m/s.

6. The process of claim 1, wherein the step of irradiating the thin layer of said water comprises maintaining the pH of the water above 6 by the addition of an alkali metal hydroxide to the water.

7. The process of claim 6, wherein the alkali metal hydroxide added to the water is sodium hydroxide.

8. The process of claim 1, wherein, during the step of irradiating the thin layer of said water, the water is passed repeatedly through a region subjected to said UV light.

9. The process of claim 1, wherein the irradiating of the thin layer of said water and the reducing of the nitrite to nitrogen are continuous flow processes.

10. The process of claim 1 wherein the water is maintained at a temperature below 25° C.

11. A device for reducing the nitrate content of water comprising a reduction reactor, a switching valve and a chemical UV reduction reactor having at least one reaction vessel, a reducing feed apparatus and an alkali metal hydroxide solution feed apparatus, said switching valve being operated in conjunction with said reducing agent feed apparatus and said alkali metal hydroxide solution feed apparatus, the UV reduction reactor comprising:
   a UV light source;
   a guide apparatus for guiding said water, said guide apparatus at least partially surrounding said UV light source, being transparent to or reflecting UV light and producing a thin film of the water to be irradiated;
   a pump for circulating the water to be irradiated through the guide apparatus; and
   a switching valve program controller for controlling the operation of the switching valve in a manner which is time-dependent or dependent on the pH of the water circulated through the UV reduction reactor.

12. The device of claim 11, wherein the guide apparatus has two separated guide walls which are transparent to UV light.

13. The device of claim 12, wherein the guide apparatus comprises an inner and an outer, coaxial, cylindrical guide tubes which tubes have a radial separation and are coaxial with the UV light source.

14. The device of claim 13, wherein the UV light source is rod-shaped and arranged on the common axis of the guide tubes.

15. The device of claim 13, wherein the outside surface of the outer guide tube is covered with a reflective material.

16. The device of claim 11, wherein the guide apparatus has a droplet nozzle ring coaxial with the UV light source which produces a cylindrical water curtain essentially coaxial with the axis of the UV light source.

17. The device of claim 16 further comprising a cylindrical guide body for the water curtain, which guide body is coaxial with the UV light source and is transparent to or reflects UV light.

18. The device of claim 17, wherein the guide body comprises a plastic wire screen.

19. The device of claim 17, wherein the guide body comprises a material bed which is transparent to the UV light and held between two coaxial walls.

20. The device of claim 11, wherein the guide apparatus comprises a distributor bowl coaxial with the UV light source and having a rim configured such that water fed into the bowl and flowing off the rim is uniformly distributed forming a cylindrical curtain essentially coaxial with the UV light source.

21. The device of claim 11, wherein the guide apparatus is transparent to visible light or permeable to heat radiation.

22. The device of claim 11, wherein the chemical reduction reactor has a discharge pump arrangement which is alternatively connectable via a servovalve either to a fresh water delivery line or to the UV reduction reactor.

23. The device of claim 22 further comprising a servovalve program controller which controls the operation of the servovalve in a manner which is time dependent or dependent on the pH of the water in the chemical reduction reactor.

* * * * *